(12) United States Patent
Yamazaki

(10) Patent No.: US 9,060,139 B2
(45) Date of Patent: Jun. 16, 2015

(54) SOLID-STATE IMAGING APPARATUS AND METHOD FOR DRIVING THE SAME

(71) Applicant: CANON KABUSHIKI KAISHA, Tokyo (JP)

(72) Inventor: Kazuo Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 13/789,097

(22) Filed: Mar. 7, 2013

(65) Prior Publication Data

US 2013/0242151 A1 Sep. 19, 2013

(30) Foreign Application Priority Data

Mar. 19, 2012 (JP) ................................. 2012-062704

(51) Int. Cl.
 *H04N 5/335* (2011.01)
 *H04N 5/378* (2011.01)
(52) U.S. Cl.
 CPC ............... *H04N 5/335* (2013.01); *H04N 5/378* (2013.01)
(58) Field of Classification Search
 CPC ..... H04N 5/335; H04N 3/155; H04N 3/1562; H04N 5/347; H04N 5/37455; H04N 5/3765; H04N 5/378

USPC .......................... 348/294, 297, 298, 301, 303
See application file for complete search history.

(56) References Cited

U.S. PATENT DOCUMENTS

| | | | |
|---|---|---|---|
| 8,049,799 B2 | 11/2011 | Sonoda et al. ................. | 348/294 |
| 8,111,312 B2 * | 2/2012 | Sato ............................... | 348/302 |
| 8,325,260 B2 | 12/2012 | Yamazaki et al. ............ | 348/308 |
| 2006/0012507 A1 * | 1/2006 | Nitta et al. ..................... | 341/156 |
| 2013/0207825 A1 | 8/2013 | Yamazaki ....................... | 341/156 |

FOREIGN PATENT DOCUMENTS

JP 2007-243324 (A) 9/2007

* cited by examiner

*Primary Examiner* — Twyler Haskins
*Assistant Examiner* — Padma Haliyur
(74) *Attorney, Agent, or Firm* — Fitzpatrick, Cella, Harper & Scinto

(57) ABSTRACT

A solid-state imaging apparatus, comprising an imaging unit and a conversion unit, including a first processing unit and a second processing unit, for converting an analog signal output from the imaging unit into a digital signal, wherein the first processing unit generates a higher-order bit of a digital signal corresponding to the analog signal, and the second processing unit, to which a clock signal having a first edge and a second edge is supplied, starts charging a capacitor and ends the charging in response to an elapse of a predetermined time since the first edge of the clock signal supplied immediately after the charging has started, and then generates a lower-order bit of the digital signal.

11 Claims, 10 Drawing Sheets

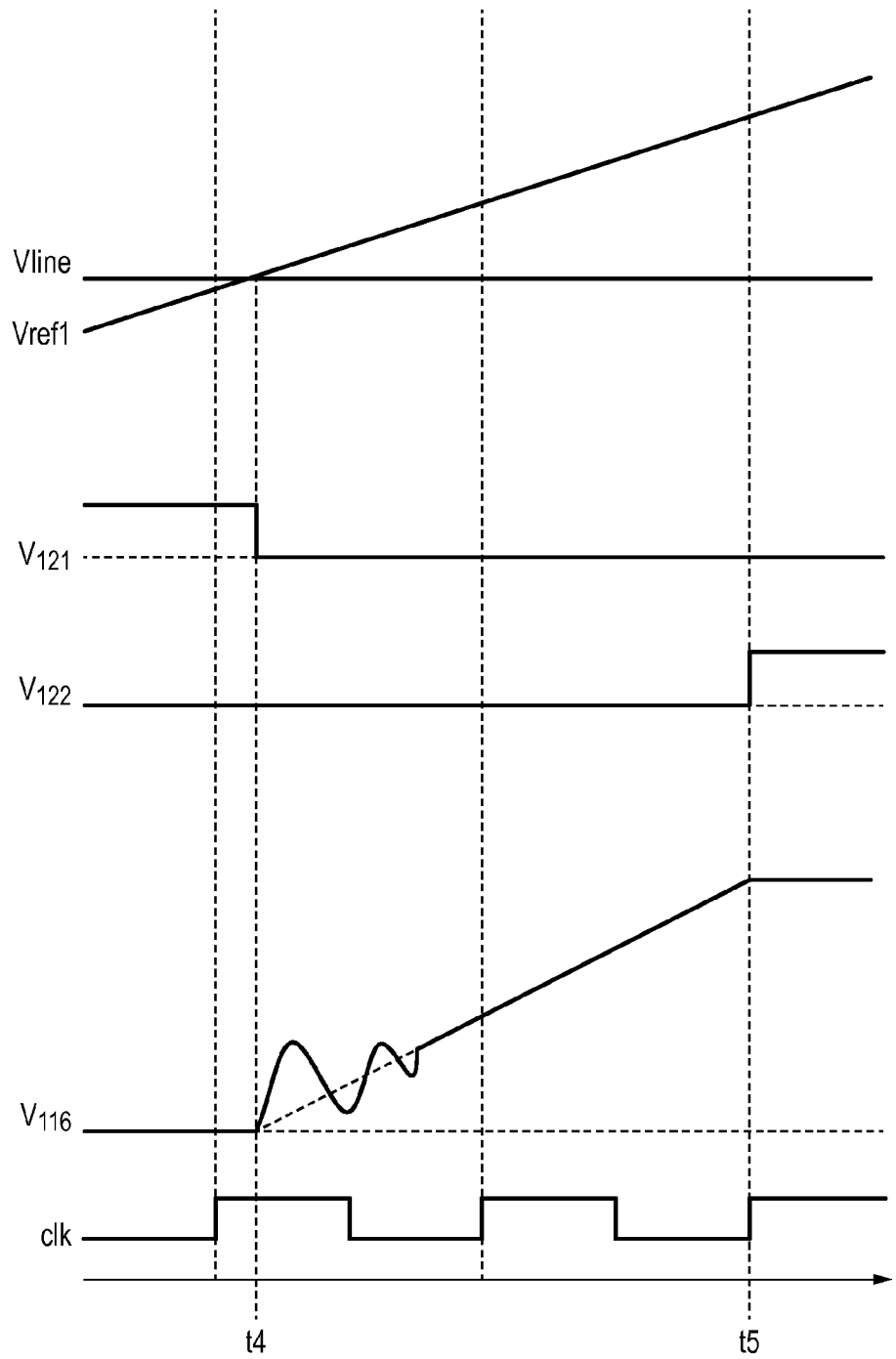

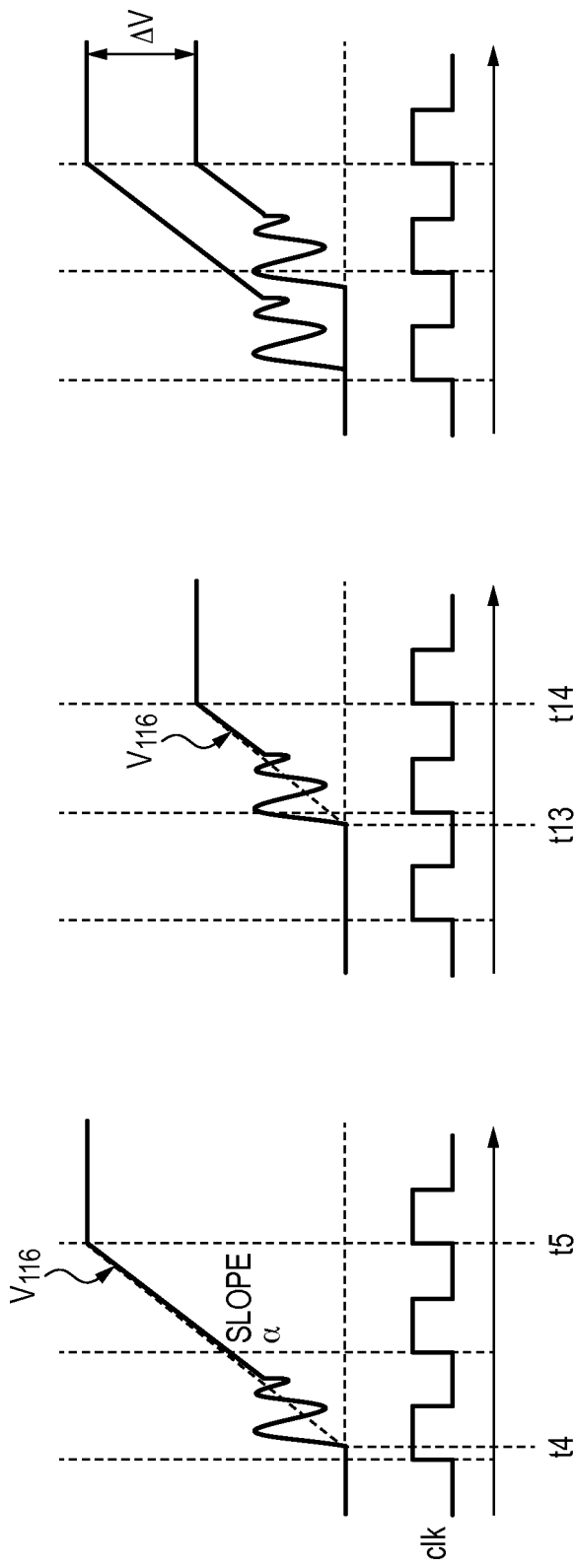

SOLID-STATE IMAGING APPARATUS AND METHOD FOR DRIVING THE SAME

BACKGROUND OF THE INVENTION

1. Field of the Invention

The present invention relates to a solid-state imaging apparatus and a method for driving the solid-state imaging apparatus.

2. Description of the Related Art

Japanese Patent Laid-Open No. 2007-243324 discloses a column-parallel A/D converter, as a method for improving precision in analog-digital conversion (hereinafter, A/D conversion) of pixel signals. The A/D converter includes a first A/D converter (first processing unit) and a second A/D converter (second processing unit), and the first processing unit performs A/D conversion to generate higher-order bits of digital signals and then the second processing unit performs A/D conversion to generate lower-order bits. The first processing unit performs the first A/D conversion by comparing an analog signal to be converted and a reference voltage. The second processing unit starts charging a capacitor by a constant current source according to the result of the comparison performed by the first processing unit, and ends the charging in response to an edge of a clock signal (a rising edge) supplied immediately thereafter. Then, the second processing unit maintains the voltage for the capacitor and performs the second A/D conversion.

FIG. 9 is a diagram showing states of a reference voltage Vref, an analog signal VA, and an output COMP from a comparator that compares the reference voltage Vref and the analog signal VA, a capacitor voltage VC and a clock signal clk. Here, the charging of the capacitor is performed during a period tc starting from the output COMP being inverted (for example, transition from a lower-state to higher-state) due to inversion in a magnitude relationship between the reference voltage Vref and the analog signal VA ending at the rising edge of the clock signal clk.

However, when the charging of the capacitor is started, the capacitor voltage VC may fluctuate due to noise resulting from switching on/off a switch or the like. Therefore, in the case where the charging period tc is shorter than a time period required for settling the noise, A/D conversion is performed on a voltage value (VC2) fluctuated by the noise, instead of a voltage value (VC1) that should be subjected to the A/D conversion. This may lead to a drop in precision of digital signals.

SUMMARY OF THE INVENTION

The present invention is advantageous for performing A/D conversion with high precision.

One of the aspects of the present invention provides a solid-state imaging apparatus, comprising an imaging unit that includes a pixel portion in which a plurality of pixels are arranged, and a conversion unit that converts an analog signal output from the imaging unit to a digital signal and outputs the digital signal, wherein the conversion unit includes a first processing unit and a second processing unit, the first processing unit generates, in accordance with a result of measuring a time from when a comparison between the analog signal output from the imaging unit and a first reference voltage is started to when a magnitude relationship between the analog signal and the first reference voltage is inverted, a higher-order bit of a digital signal corresponding to the analog signal, and the second processing unit to which a clock signal having a first edge and a second edge is supplied, starts charging a capacitor in response to the inversion of the magnitude relationship in the first processing unit, ends the charging of the capacitor in response to an elapse of a predetermined time since the first edge of the clock signal supplied immediately after the charging has started, and then generates a lower-order bit of the digital signal by counting the clock signal from when a comparison between the capacitor and a second reference voltage is started to when a magnitude relationship between the capacitor and the second reference voltage is inverted.

Further features of the present invention will become apparent from the following description of exemplary embodiments with reference to the attached drawings.

BRIEF DESCRIPTION OF THE DRAWINGS

FIG. 3B is an enlarged diagram of a portion of FIG. 3A.

FIGS. 4A to 4C are diagrams for illustrating waveforms generated when the solid-state imaging apparatus is driven.

DESCRIPTION OF THE EMBODIMENTS

First Embodiment

Figure 1:
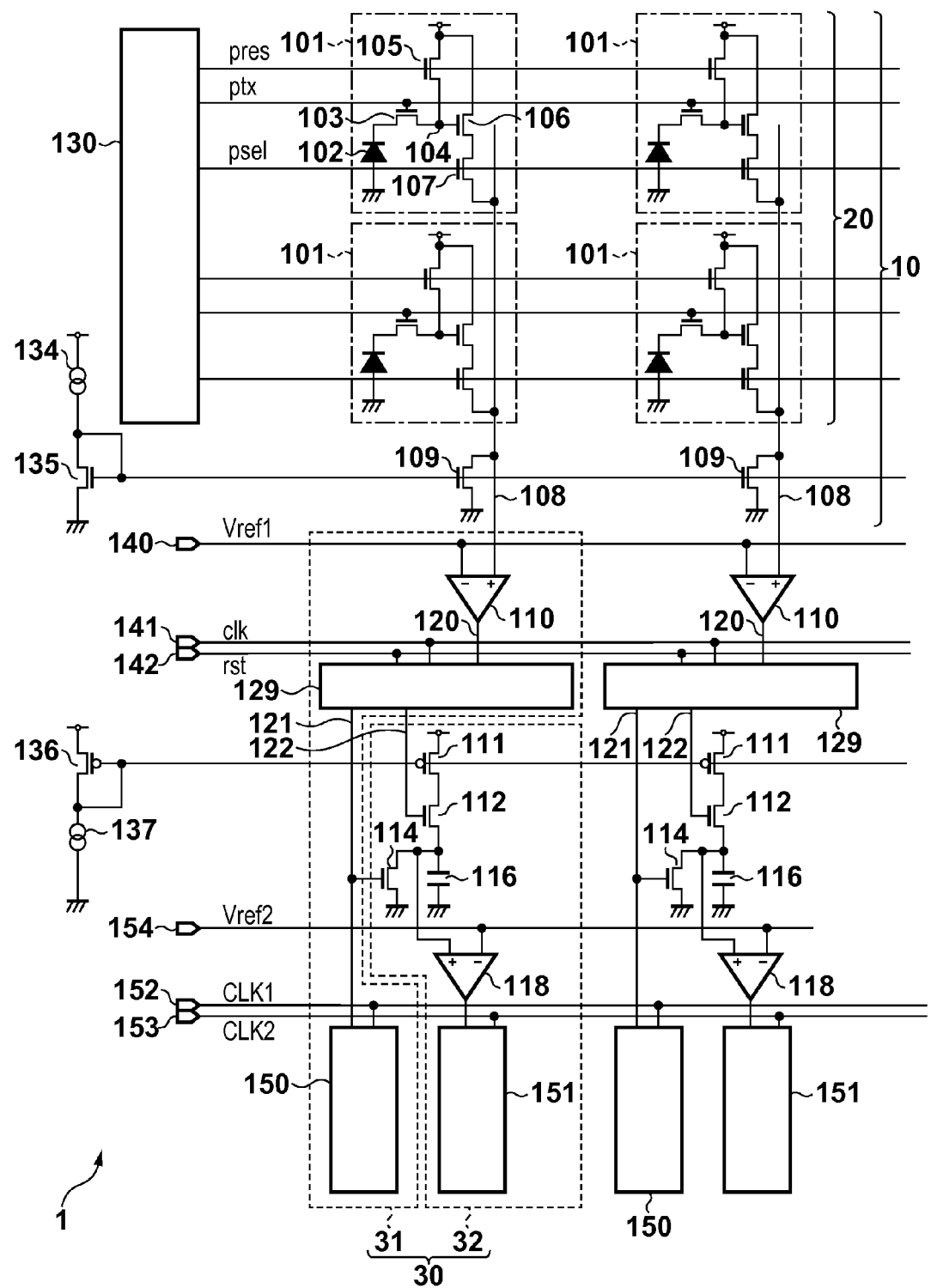
FIG. 1 is a diagram for illustrating an example of the configuration of a solid-state imaging apparatus according to a first embodiment.

A solid-state imaging apparatus 1 according to the first embodiment will be described with reference to FIGS. 1 to 4. The solid-state imaging apparatus 1 includes an imaging unit 10 and a conversion unit 30, as shown in FIG. 1. The imaging unit 10 includes a pixel portion 20 in which a plurality of pixels 101 are arranged, and here two-row by two-column pixels 101 are shown for the sake of simplification. The conversion unit 30 can convert analog signals such as pixel signals output from the imaging unit 10 or signals obtained by amplifying the pixel signals to digital signals. Here, the conversion unit 30 includes a first processing unit 31 and a second processing unit 32, and one conversion unit 30 is disposed in each column of the pixel portion 20 herein. Also, the solid-state imaging apparatus 1 may include vertical scanning circuits 130 that control the plurality of pixels 101 on a row-by-row basis.

The pixel 101 includes a photoelectric conversion unit 102, a transmission transistor 103, a floating diffusion node 104 (FD node 104), a reset transistor 105, a source follower transistor 106 and a selection transistor 107. Here, a photodiode is used as the photoelectric conversion unit 102. The gate terminal of the transmission transistor 103 is connected to a signal wiring for a control signal ptx. When the control signal ptx is activated, electric charges that are generated by the photoelectric conversion unit 102 receiving light and accumulated therein are transmitted to the FD node 104 by the transmission transistor 103. The amount of current that flows into the source follower transistor 106 may change in accordance with the fluctuation in the amount of the electric charges transmitted to the FD node 104. The gate terminal of the selection transistor 107 is connected to a signal wiring for a control signal psel. When the control signal psel is activated, the selection transistor 107 may output pixel signals corresponding to the amount of the current of the source follower transistor 106 to a column signal line 108. Also, the gate terminal of the reset transistor 105 is connected to a signal wiring for a control signal pres. When the control signal pres is activated, the reset transistor 105 may reset the potential of the FD node 104.

A transistor 109 is disposed in each of the column signal lines 108 corresponding to each column of the imaging unit 10. The transistor 109 is used as a constant current source that allows a constant current to flow by forming a current mirror circuit using a constant current source 134 and a transistor 135. The imaging unit 10 may include an amplifier (not shown) that amplifies image signals read out from the pixel portion 20.

Each first processing unit 31 includes a first comparator 110, a state machine 129 and a first counter 150. The column signal line 108 is connected to a non-inverting input terminal (indicated by "+") of the first comparator 110. A first reference voltage Vref1 (here, a ramp signal is used) is input to an inverting input terminal (indicated by "−") of the first comparator 110. The first reference voltage Vref1 is input from a terminal 140. A signal COMP01 output from the first comparator 110 is input to the state machine 129 via a signal wiring 120. Also, a clock signal clk from a control terminal 141 is input to the state machine 129, and a reset signal rst from a control terminal 142 is input to the state machine 129. The state machine 129 may output signals in accordance with operations described below, in response to these inputs via the signal wirings 121 and 122.

Figure 2:
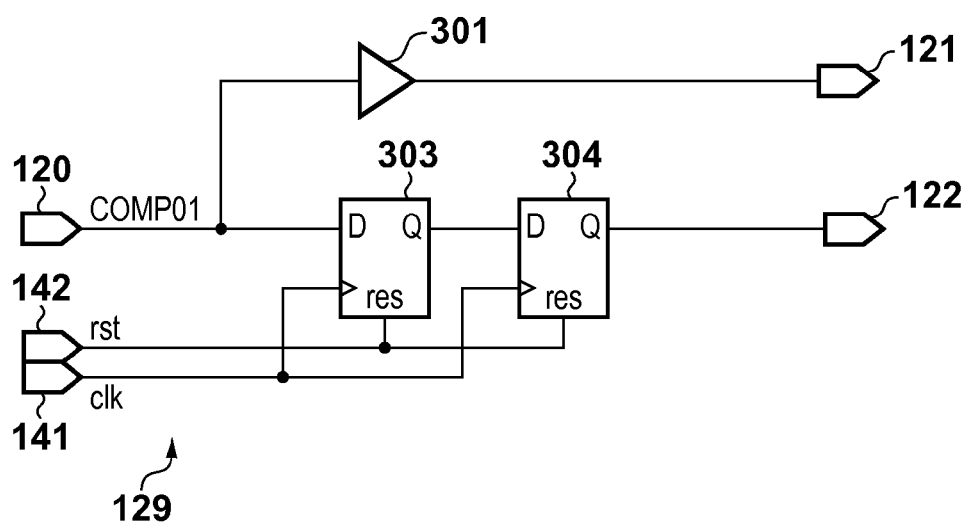
FIG. 2 is a diagram for illustrating an example of the configuration of a state machine used in the first embodiment.

FIG. 2 shows the state machine 129 used in the present embodiment. The state machine 129 is configured with flip-flop circuits 303 and 304. The clock signal clk having a first edge and a second edge is input from the control terminal 141. Here, although it is assumed that the first edge is a rising edge and the second edge is a falling edge, it is possible to assume that the first edge is a falling edge and the second edge is a rising edge. The state machine 129 may output the signal COMP01 via a signal wiring 122 when a 2-nd first edge of the clock signal clk is input after the output signal COMP01 from the first comparator 110 is inverted. Here, although the state machine 129 is configured with two stages, i.e. the flip-flop circuits 303 and 304, timing at which the signal COMP01 is input and is output via the signal wiring 122 can be adjusted by changing the number of these stages. Also, the flip-flop circuits 303 and 304 can be initialized by activating the reset signal rst. Also, the output from the state machine 129 via the signal wiring 121 is an output that is obtained by a buffer 301 buffering the output signal COMP01 from the first comparator 110. The signal wiring 121 is connected to an input of a first counter 150 and the gate terminal of the switch transistor 114 included in the second processing unit 32. The signal wiring 122 is connected to the gate terminal of the switch transistor 114 included in the second processing unit 32.

The second processing unit 32 includes a transistor 111, a switch transistor 112, the switch transistor 114, a capacitor 116, a second comparator 118 and a second counter 151. The transistor 111 is used as a constant current source that allows a constant current to flow by forming a current mirror circuit using a constant current source 137 and a transistor 136. The gate terminal of the switch transistor 112 is connected to the signal wiring 122, and the switch transistor 112 allows the current to flow from the transistor 111 in a conductive state. Also, the signal wiring 121 is input to the gate terminal of the switch transistor 114. The capacitor 116 can be charged via the transistor 111 when the switch transistor 114 is switched to a non-conductive state. Also, the electric charges that has been charged in the capacitor 116 are discharged when the switch transistor 114 is switched to the conductive state, and a voltage $V_{116}$ of the capacitor 116 reaches 0 (V). The voltage $V_{116}$ is input to the non-inverting input terminal (indicated by "+") of the second comparator 118. A second reference voltage Vref2 (here, a ramp signal is used) is input to the inverting input terminal (indicated by "−") of the second comparator 118. The second reference voltage Vref 2 is input from a terminal 154. Signals output from the second comparator 118 are input to the second counter 151.

The first counter 150 is a counter circuit in response to a clock signal CLK1, for example, and in the present embodiment this can generate a portion corresponding to higher-order bits of a digital signal that corresponds to an analog signal input to the conversion unit 30. Also, the second counter 151 is a counter circuit in response to a clock signal CLK2, for example, and this can generate a portion corresponding to lower-order bits of the digital signal. The clock signal CLK 1 is input from a terminal 152, and the clock signal CLK2 is input from a terminal 153. Also, the reset signal rst, the clock signals clk, CLK1 and CLK2 can be input from a timing generator (not shown) that can be included in the solid-state imaging apparatus 1, for example. Although clock signals CLK1 and CLK2 that synchronize with the clock signal clk are used herein, clock signals that have different cycles may be used with use of a PLL or the like depending on the specification of the solid-state imaging apparatus.

With the above-described configuration, the conversion unit 30 can convert the first analog signal and the second analog signal output from the imaging unit 10 to a first digital signal and a second digital signal and respectively output the first and second digital signals. The first analog signal includes a noise component as an output generated when potentials of the FD nodes 104 of each pixel 101 are reset. The second analog signal includes the noise component and a component corresponding to light incident on the pixel portion 20. Thereafter, the solid-state imaging apparatus 1 calculates and outputs the first digital signal and the second digital signal output from the conversion unit 30, or the difference between these signals by a horizontal scanning circuit (not shown), for example. Finally, digital signals regarding the image signals output from the pixel portion 20 are accordingly obtained.

Figure 3A:
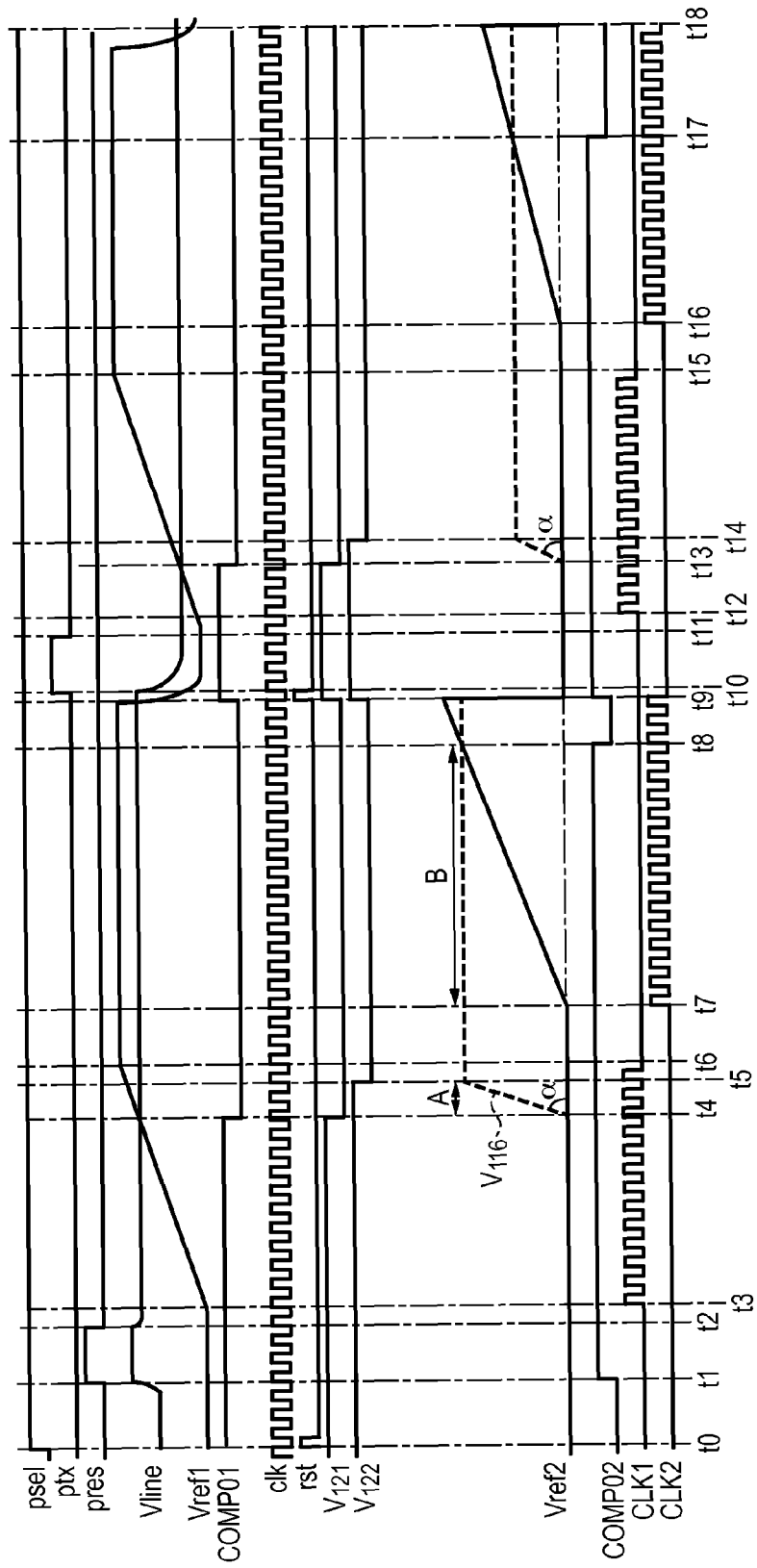
FIG. 3A is a diagram for illustrating a method for driving the solid-state imaging apparatus according to the first embodiment.

FIG. 3A shows states of each signal when the solid-state imaging apparatus 1 is driven where the horizontal axis indicates a time. In FIG. 3A, states of the control signals psel, ptx and pres that control the pixels 101, a potential Vline of the column signal line 108, the first reference voltage Vref1, and a signal COMP01 output from the first comparator 110 are shown. Thereunder, states of the clock signal clk and the reset signal rst are shown. Thereunder, states of potentials $V_{121}$ and $V_{122}$ of the signal wirings 121 and 122 (output signals from the state machine 120), the second reference voltage Vref2, and a signal COMP02 output from the second comparator 118 are shown.

The first analog signal containing a noise component is converted to the first digital signal from time t0 to time t9. Higher-order bits of the first digital signal are generated from time t3 to time t4 (a first step), and lower-order bits of the first digital signal are generated from time t7 to time t8 (a second step). Similarly, the second analog signal containing a noise component and a component corresponding to light incident on the pixel portion 20 is converted to the second digital signal from time t9 to time t18. Higher-order bits of the second digital signal are generated from time t12 to time t13 (a third step), and lower-order bits of the second digital signal are generated from time t16 to time t17 (a fourth step). Thereafter, the solid-state imaging apparatus 1 can output the first digital signal and the second digital signal obtained in steps 1 to 4, or calculate and output the difference between these signals (a fifth step).

Hereinafter, a method for driving the solid-state imaging apparatus 1 is described in detail with reference to FIG. 3A. At time t0, the control signal psel is turned high so that each of the pixels 101 in a predetermined row in the pixel portion 20 is selected. At time t1, the control signal pres is turned high to reset the FD nodes 104. At time t2, the control signal pres is turned low to cancel the resetting. Here, the potential Vline of the column signal line 108 corresponding to the potential of the FD node 104 corresponds to the first analog signal. Also, the first reference voltage Vref1 is in a lower state than that of the potential Vline (here, 0 (V)), and the output signal COMP01 from the first comparator 110 is in the higher-state.

At time t3, the first reference voltage Vref1 starts to rise with a constant slope, and also the supply of the clock signal CLK1 to the first counter 150 is started. Accordingly, the first processing unit 31 starts comparison between the signal Vline output from imaging unit 10 and the first reference voltage Vref1 (a ramp signal). Also, although the rising of the first reference voltage Vref1 and the supply of the clock signal CLK1 are started at the same time t3 here, the configuration may be possible in which the rising and the supply are started at different times and an offset component is included in the measurement thereof.

At a given time, the magnitude relationship between the signal Vline and the first reference voltage Vref1 is inverted, and the output signal COMP01 from the first comparator 110 is inverted. This time is denoted as time t4. The first counter 152 measures a time from time t3 to time t4 by counting the number of the first edges (or the second edges) of the clock signal CLK1. The first processing unit 31 generates higher-order bits of the digital signal corresponding to the signal Vline (analog signal) in accordance with the result of the measurement (a count value) obtained in this manner (a first step).

Also, at this time t4, the potential $V_{121}$ of the signal wiring 121 (one of the outputs from the state machine 129) is turned low, and the switch transistor 114 is switched to the non-conductive state. In other words, the second processing unit 32 starts charging the capacitor in response to the inversion in the magnitude relationship in the first processing unit 31. More specifically, the charging of the capacitor 116 is started via the switch transistor 112 from the transistor 111 used as the constant current source. Here, letting C1 be the value of capacitor 116, Q1 be the amount of the electric charges of the capacitor 116 and I be the value of the current of the constant current source, a rising slope α of the voltage $V_{116}$ of the capacitor 116 can be expressed as follows.

$$\alpha = dV/dt = (d(Q1/C1))/dt = I/C1 \quad \text{Equation (1)}$$

Thereafter, as shown in FIG. 3B (enlarged diagram of a portion of FIG. 3A), the charging of the capacitor 116 is ended when a predetermined time has elapsed since the first edge (rising edge) of the clock signal CLK1 supplied immediately after the charging of the capacitor 116 has started. This time is denoted as time t5. Here, it is preferable that the predetermined time is at least one cycle of the clock signal CLK1, for example. In the present embodiment, the charging is ended at the 2-nd "first edge" (rising edge) of the clock signal CLK1 by the above-described configuration of the state machine 129. In other words, the time (a period A) from time t4 to time t5 is a period for charging the capacitor 116 in order to perform the second step. Then, the voltage $V_{116}$ of the capacitor 116 can be maintained.

Here, as shown in FIG. 4A, the voltage $V_{116}$ rises with the above-described slope a while the capacitor 116 is charged from time t4 to time t5. However, in reality, the waveform of the voltage $V_{116}$ may be influenced by, for example, the switch transistor 114 switching between the conductive state and the non-conductive state and noise resulting from the fluctuation in the power supply voltage. This may lead to a drop in precision of lower-order bits of the digital signals, which are to be generated later. In view of this, in the present embodiment, the charging of the capacitor 116 is performed from the first edge of the clock signal CLK1 supplied immediately after the charging was started to when a predetermined time has elapsed. Although it is assumed that the predetermined time is one cycle of the clock signal CLK1 which is equivalent to a period in which the influence of this noise has disappeared in the present embodiment, it may be a period longer than one cycle.

At time t6, the rising of the first reference voltage Vref1 stops and the supply of the clock signal CLK1 is also stopped.

At time t7, the second reference voltage Vref2 starts to rise with a constant slope, and also the supply of the clock signal CLK2 to the second counter 151 is started. Accordingly, the second processing unit 32 starts the comparison between the voltage $V_{116}$ of the capacitor 116 and the second reference voltage Vref2 (a ramp signal).

At a given time, the magnitude relationship between the voltage $V_{116}$ of the capacitor 116 and the second reference voltage Vref2 is inverted, and the output signal COMP02 of the second comparator 118 is inverted. This time is denoted as time t8. The second counter 151 measures a time (a period B) from time t7 to time t8 by counting the number of the first edges (or the second edges) of the clock signal CLK2. The second processing unit 32 generates lower-order bits of the digital signals according to this result (a second step). Here, since the period B is sufficiently longer than the period A, it is possible to increase the resolution and to generate the lower-order bits of the digital signal with high precision.

At time t9, the supply of the clock signal CLK2 is stopped, the first reference voltage Vref1 and the second reference voltage Vref2 are initialized, the reset signal rst is turned high, and thereby the state of the state machine 129 is initialized. Accordingly, the step in which the first analog signal is converted to the digital signal is ended, and the step in which the second analog signal is converted to the digital signal can be started.

At time t10, the reset signal rst is turned low to cancel the resetting of the state machine 129, and the control signal ptx is also turned high. Accordingly, the electric charges generated by the photoelectric conversion unit 102 receiving light and accumulated therein can be transmitted to the FD node 104.

At time t11, the control signal ptx is turned low to end the transmission of the electric charges. Here, the potential Vline of the column signal line 108 that corresponds to the potential of the FD node 104 corresponds to the second analog signal.

Thereafter, the same operations as those performed from time t3 to time t9 are performed from time t12 to time t18, and the second digital signal corresponding to the second analog signal is generated (a third step and a fourth step). Here, as shown in FIG. 4B, the voltage $V_{116}$ of the capacitor 116 in charging from time t13 to time t14 rises with the slope α. However, as from time t4 to time t5, the waveform of the voltage $V_{116}$ may be influenced by noise. This may lead to a drop in precision of lower-order bits of the digital signals, which are to be generated later. In view of this, as described above, the charging of the capacitor 116 is performed from the first edge (rising edge) of the clock signal CLK1 supplied immediately after the charging was started to when a predetermined period has elapsed.

In this manner, the first digital signal and the second digital signal are generated by respectively converting the first analog signal generated after pixels 101 are reset and the second analog signal generated after the electric charges are transmitted. Thereafter, the difference between the first digital signal and the second digital signal can be calculated and output inside or outside the solid-state imaging apparatus 1 by known subtraction processing, for example (a fifth step). Here, as shown in FIGS. 4A and 4B, the waveform of the voltage $V_{116}$ from time t4 to time t5 and the waveform of the voltage $V_{116}$ from time t13 to time t14 may be influenced by noise when the charging of the capacitor 116 is started. In view of this, in the second step and the fourth step, as described above, the second processing unit 32 respectively generates lower-order bits of the first digital signal and the second digital signal by charging the capacitor 116 for a longer period by a predetermined time. However, as described above, in the fifth step, the difference between the first digital signal and the second digital signal can be calculated inside or outside the solid-state imaging apparatus 1. Accordingly, in the fifth step, lower-order bits of the digital signal that corresponds to the difference between the voltage $V_{116}$ of the capacitor 116 charged from time t4 to time t5 and the voltage $V_{116}$ of the capacitor 116 charged from time t13 to time t14 are generated. In other words, as a result, as shown in FIG. 4C, a signal component (ΔV in FIG. 4C) obtained by subtracting, from the component containing the noise generated when the charging is started, the component generated when the capacitor is charged for a longer period by a predetermined period until the potential fluctuation due to the noise stops corresponds to the lower-order bits of the digital signal obtained in the fifth step. In this manner, it is possible to perform A/D conversion with high precision while suppressing an increase in the conversion time.

Second Embodiment

Figure 5:
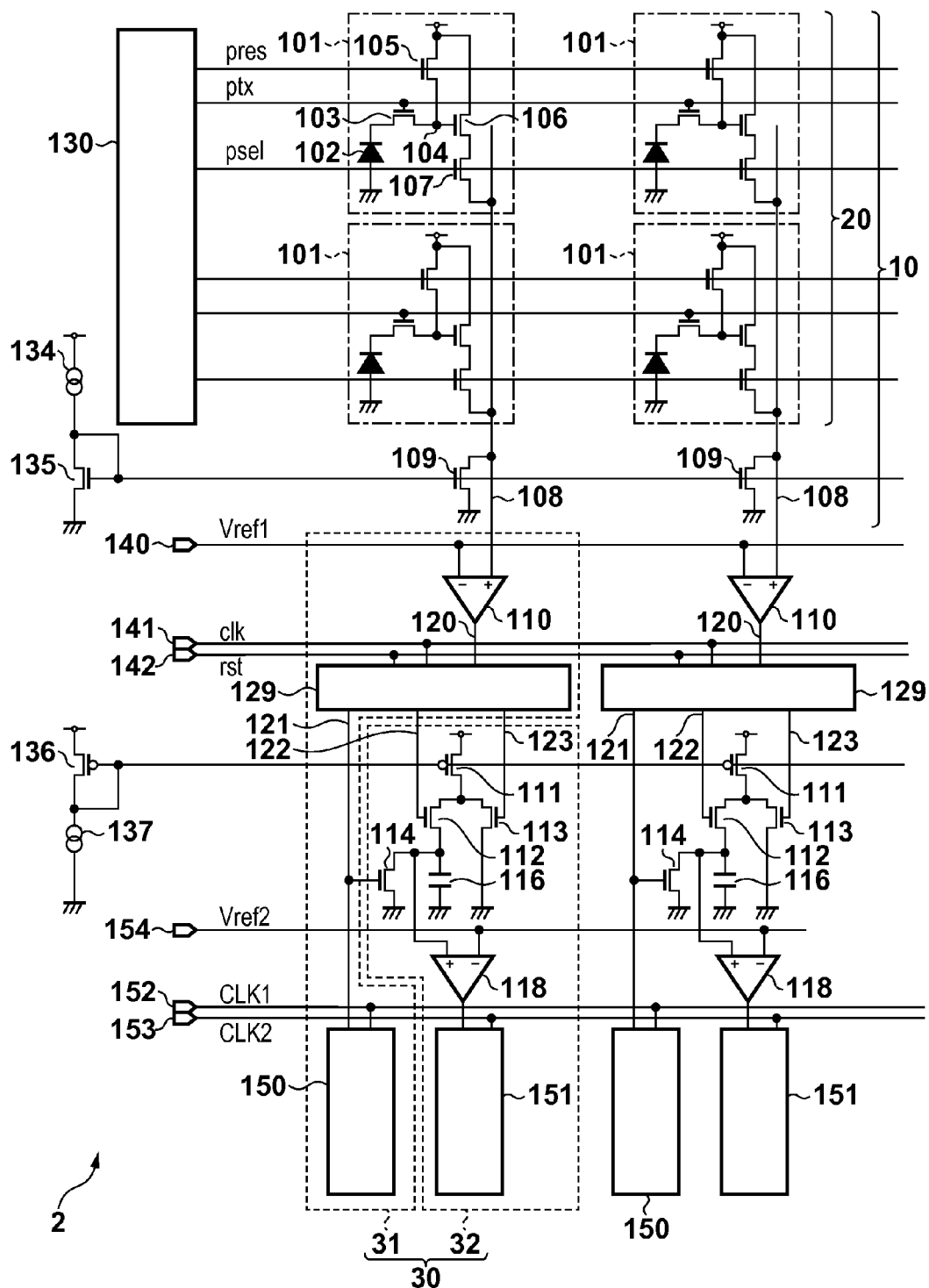
FIG. 5 is a diagram for illustrating an example of the configuration of a solid-state imaging apparatus according to a second embodiment.
Figure 6:
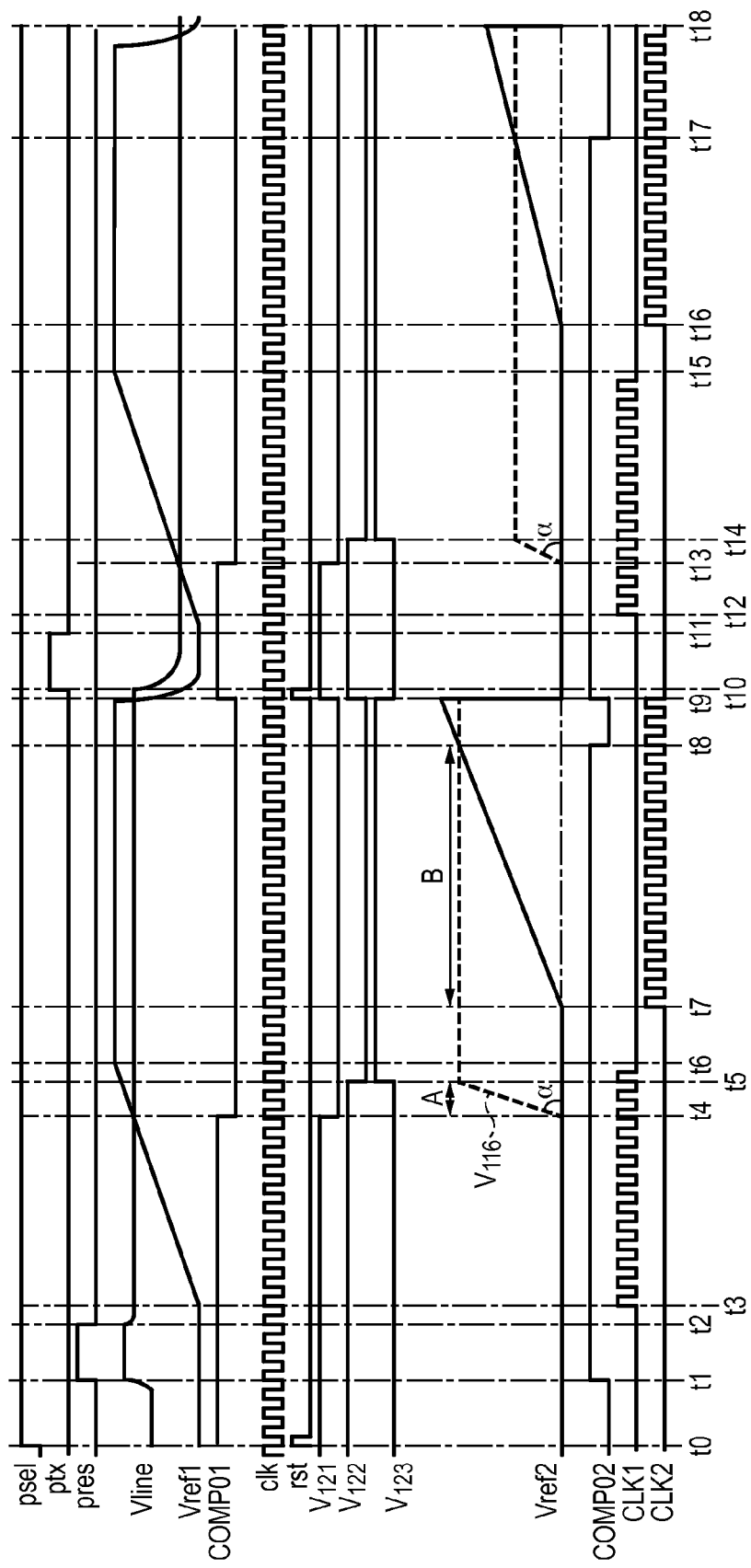
FIG. 6 is a diagram for illustrating a method for driving the solid-state imaging apparatus according to the second embodiment.

A solid-state imaging apparatus 2 of the second embodiment will be described with reference to FIGS. 5 and 6. Signs and numbers used in FIGS. 5 and 6 represent the same as those in the first embodiment. The present embodiment differs from the first embodiment in that the second processing unit 32 further includes a switch transistor 113, as shown in FIG. 5.

The configuration of the second processing unit 32 in the present embodiment will be described in detail hereinafter, with reference to FIG. 5. In the second processing unit 32, the capacitor 116 and the switch transistor 112 are arranged in series and the switch transistor 114 is also arranged for starting charging of the capacitor 116. Also, the transistor 111 is arranged in the second processing unit 32 as a constant current source. Here, it is assumed that the path in which the capacitor 116 and the switch transistor 112 are arranged in series is a first path. In this embodiment, a second path including the switch transistor 113 is arranged in parallel to the first path. In other words, the second processing unit 32 includes the first path and the second path that are arranged in parallel to each other, and the constant current source that is arranged in series with these paths.

In the present embodiment, the state machine 129 further outputs a signal whose state is the inverse of the potential $V_{122}$ via the signal wiring 123. This signal wiring 123 is connected to the gate terminal of the switch transistor 113. Here, the signal whose state is the inverse of the potential $V_{122}$ can easily be generated if a one-stage inverter is added to the configuration of the state machine 129 shown in FIG. 2, for example.

Effects of the case where the solid-state imaging apparatus 2 is driven will be described with reference to FIG. 6. Since the solid-state imaging apparatus 2 is similar to the solid-state imaging apparatus 1 of the first embodiment except for the operations of the switch transistor 113 and the potential $V_{123}$ of the signal wiring 123, a detailed description thereof will be omitted. It can be seen from FIG. 6 that the state of the potential $V_{122}$ is the inverse of the state of the potential $V_{123}$, and thus the path in which the current of the transistor 111 used as the current source flows can be switched to either the first path or the second path while the solid-state imaging apparatus 2 is being driven. More specifically, an electrical connection target of the transistor 111 may be switched to either the capacitor 116 or a grounding. Accordingly, a constant current flows in the second processing unit 32 at all times, for example, before time t4 (prior to the charging of the capacitor 116), from time t4 to time t5 (during the charging), and after time t5 (after the charging). In other words, since there is no fluctuation in the amount of current that flows in the second processing unit 32 during the charging of the capacitor 116 and before and after the charging, it is possible to suppress the generation of noise as shown in FIGS. 4A to 4C.

Here, in the first embodiment, in order to avoid any influence of the noise, the charging of the capacitor 116 is started at time t4, and the charging of the capacitor 116 is ended at time t5 at which a predetermined time has elapsed since the first edge of the clock signal CLK1 supplied immediately after the charging has started. However, in the present embodiment, since the generation of the noise is suppressed by the abovementioned method, it is possible to shorten the "predetermined time" needed to be secured. Accordingly, for example, the number of flip-flop circuits can be reduced, which is advantageous for optimizing circuit design.

Also, for example, it can be thought that while the solid-state imaging apparatus 2 is being driven, the power supply voltage falls in a central region thereof and the gate-source voltage of the transistor 111 drops, thereby reducing the amount of the current of the transistor 111. However, since the fluctuation in the current amount is suppressed, the present embodiment is advantageous for correction processing on a drop in the current amount and it is also possible to reduce errors in conversion performed by the conversion unit 30.

In this manner, the solid-state imaging apparatus 2 charges the capacitor 116 by switching the switch transistor 112 (a first switch) to the conductive state. The solid-state imaging apparatus 2 switches the switch transistor 113 (a second switch) to the non-conductive state while the capacitor 116 is being charged. On the other hand, the switch transistor 113 (the second switch) is switched to the conductive state before and after the capacitor 116 is charged. As described above, according to the present embodiment, above-described advantageous effects can be achieved, in addition to the effects of the first embodiment.

Third Embodiment

Figure 7:
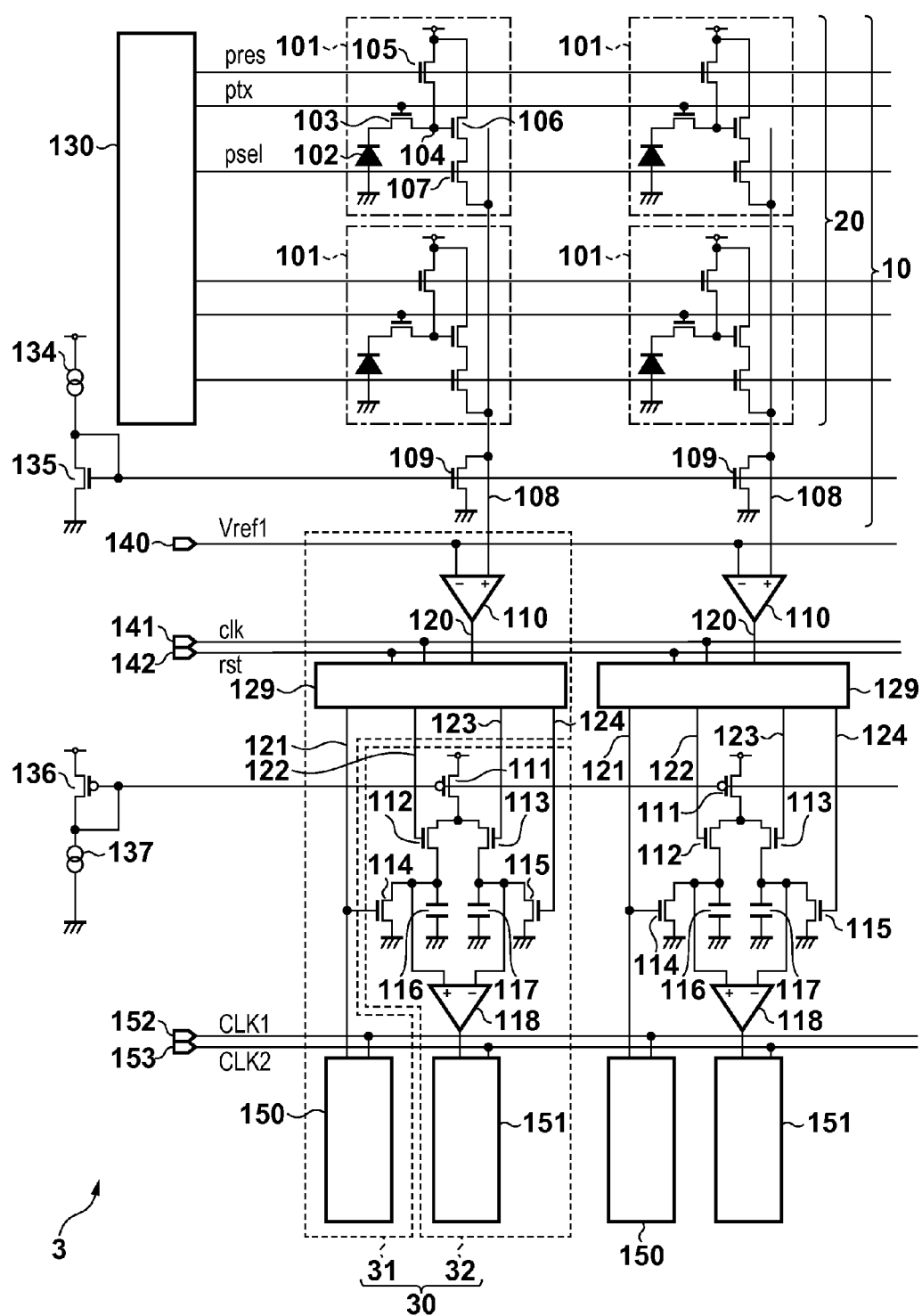
FIG. 7 is a diagram for illustrating an example of the configuration of a solid-state imaging apparatus according to a third embodiment.
Figure 8:
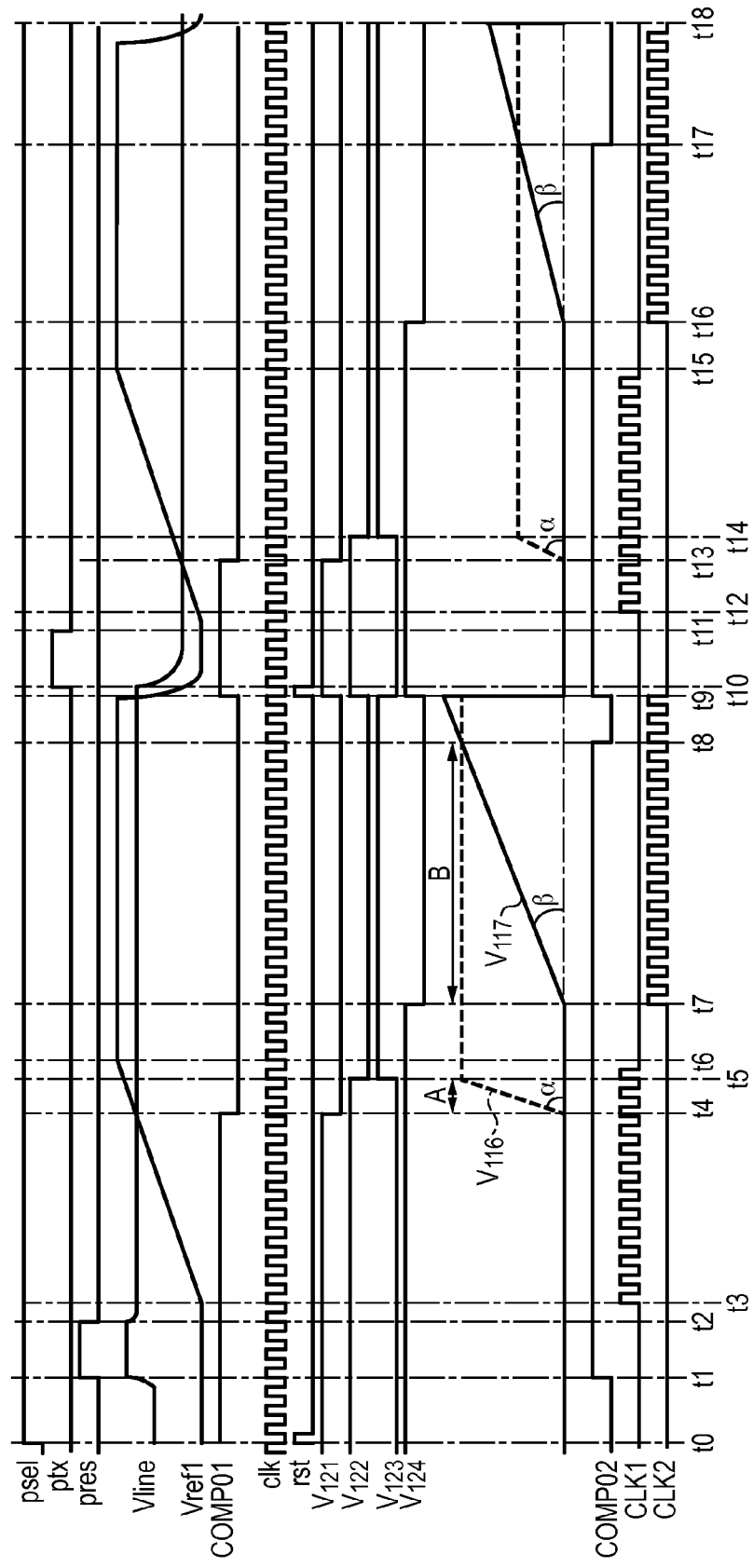
FIG. 8 is a diagram for illustrating a method for driving the solid-state imaging apparatus according to the third embodiment.
Figure 9:
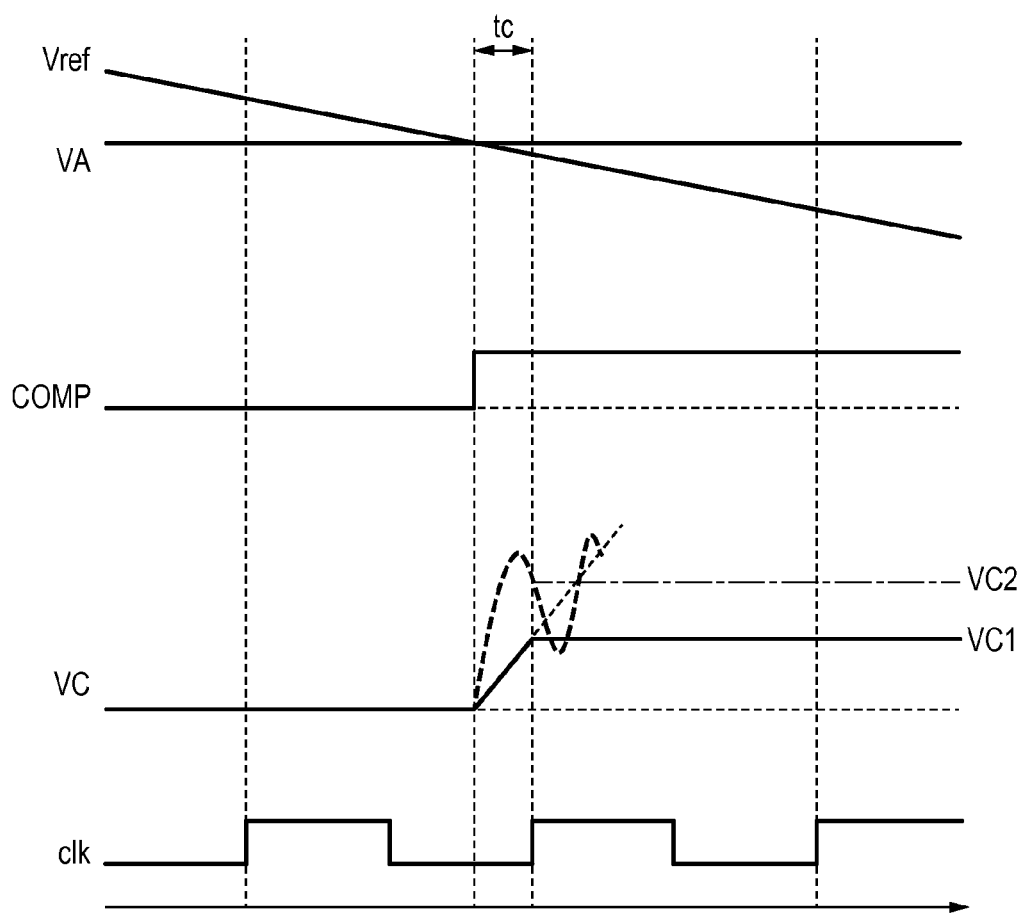
FIG. 9 is a diagram for illustrating noise that may be generated in charging a capacitor for generating lower-order bits.

A solid-state imaging apparatus 3 of the third embodiment will be described with reference to FIGS. 7 and 8. Signs and numbers used in FIGS. 7 and 8 represent the same as those in the first and second embodiments. The present embodiment differs from the first embodiment in that the second processing unit 32 has a second path including a circuit for generating ramp signals instead of the second reference voltage Vref2, as shown in FIG. 7. For example, the switch transistor 113 and a capacitor 117 are arranged in series in the second path, and the voltage $V_{117}$ of the capacitor 117 is input to the inverting input terminal of the second comparator 118. Also, a switch transistor 115 is disposed for starting the charging of the capacitor 117. The capacitor 117 is used as a capacitor for generating a reference voltage. In other words, the voltage $V_{117}$ generated by charging the capacitor 117 by a constant current source is used as the second reference voltage Vref2.

Similarly to the second embodiment, since the state of the potential $V_{122}$ is the inverse of the state of the potential $V_{123}$, the path in which the current of the transistor 111 used as the current source flows can be switched to either the first path or the second path while the solid-state imaging apparatus 3 is being driven. The signal wiring 124 is connected to the gate terminal of the switch transistor 115. The signals input to the gate terminal of the switch transistor 115 (potential $V_{124}$ of the signal wiring 124) may be generated by the timing generator (not shown), for example.

A method for driving the solid-state imaging apparatus 3 is described with reference to FIG. 8, particularly focusing on the first step and the second step. Since steps from time t0 to time t4 are the same as those in the first and second embodiments, the descriptions thereof are omitted. At time t5, the potential $V_{122}$ is turned low, the switch transistor 112 is switched to the non-conductive state, and the charging of the capacitor 116 is ended. At the same time, the potential $V_{123}$ is turned high, the switch transistor 113 is switched to the conductive state, and the electrical connection target of the transistor 111 is switched to the second path. Since the potential $V_{124}$ is in the higher-state, the charging of the capacitor 117 by the transistor 111 is not started and the voltage $V_{117}$ of the capacitor 117 does not rise. In other words, the electrical connection target of the transistor 111 is the grounding. Thus, the same effects as those in the second embodiment can be achieved. Since the step at time t6 is the same as that in the first and second embodiments, the description thereof is omitted.

At time t7, the potential $V_{124}$ is turned low, the charging of the capacitor 117 is started, and the voltage $V_{117}$ rises. Here, the value of the capacitor 117 is denoted as C2 (for example, C2 is four times greater than C1), and the value of the current of the constant current source is denoted as I. Here, a rising slope β of the voltage $V_{117}$ of the capacitor 117 can be expressed as follows, along with Equation (1).

$$\beta = I/C2 = C1 \times \alpha/C2 = \alpha/4 \qquad \text{Equation (2)}$$

In this case, the relationship between the period A and the period B can be expressed as B=4A. This means that it is possible to generate two lower-order bits of the digital signal in the case where the clock signal having the same frequency is used. Also, the number of bits for the lower-order bits can be increased by three bits or four bits by letting the relationship between C1 and C2 be 1:8 or 1:16, for example. Since steps from time t8 to time t9 are the same as those in the first and second embodiments, the descriptions thereof are omitted. Thereafter, the third step and the fourth step are performed from time t9 to time t18 in the same manner.

As described above, the precision in generating the lower-order bits in the second step and the fourth step depends highly on the relationship between the capacitor 116 and the capacitor 117, and is not influenced by the fluctuation in the current amount of the transistor 111 that serves as the constant current source. In particular, the capacitor element has low manufacturing variation and property variation, with respect to the transistor. Thus, according to the present embodiment, in addition to the effects of the first and the second embodiments, it is possible to generate the lower-order bits with higher precision.

Although the three embodiments are described as above, it is naturally true that the present invention is not limited to these, and it is possible to change the objective, conditions, usages, functions and other measures as needed and the present invention can be carried out by other embodiments. For example, in each embodiment, although the pixel portion is configured as a CMOS image sensor, it may be configured as any other sensors. Also, for example, although each of the pixels that are configured with NMOS transistors is described, they may be configured with PMOS transistors. The same applies to the other transistors, and for example signals that determine the activation and the inactivation of each function can have opposite configurations in the solid-state imaging apparatuses 1 to 3. For example, it is possible that the first comparator 110 and the second comparator 118 are configured such that the outputs of their comparison results are opposite of those in the abovementioned embodiments. Also, although the first counter 150 and the second counter 151 measure times by count-up operations in the embodiments, they may use count-down operations, for example. Also, instead of the first counter 150 and the second counter 151, a common counter may be used and respective measurement results are held separately, for example. Also, although the clock signal having the same frequency was supplied to the first processing unit 31 and the second processing unit 32, the above-described driving method may be carried out using clock signals having different frequencies.

Moreover, although the state machine 129 is configured with the flip-flop circuits 303 and 304, i.e. the two stages, it is possible to change a time period for charging the capacitor 116 by changing the number of stages, for example. Also, it is possible to change this charging time period by changing the number of stages of the flip-flop circuits in accordance with the clock signal as long as a desired period is determined as the charging time period, and the present invention is not limited to this configuration. Also, for example, it is possible to increase the number of bits by further repeating similar processing using a second state machine 129' besides the state machine 129. Also, a part or the whole of the operations of the abovementioned function blocks may be controlled by an OS or the like that is operating on a computer with or instead of a controller.

Although the solid-state imaging apparatuses included in a camera are described in the above embodiments, the concept of the camera encompasses not only an apparatus whose main purpose is imaging but also an apparatus (a personal computer or a portable terminal, for example) that has an auxiliary imaging function. The camera may include the solid-state imaging apparatus according to the present invention described as abovementioned embodiments and the signal processing unit that processes the signals output from this solid-state imaging apparatus. This signal processing unit may include a processor that processes digital data obtained in the above-mentioned embodiments, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-062704, filed Mar. 19, 2012, which is hereby incorporated by reference herein in its entirety.

What is claimed is:

1. A solid-state imaging apparatus comprising:
an imaging unit that includes a pixel portion in which a plurality of pixels are arranged; and
a conversion unit that converts an analog signal output from the imaging unit to a digital signal and outputs the digital signal,
wherein the conversion unit includes:
a first processing unit to which a first reference voltage and a clock signal are supplied, the first processing unit including a delay circuit and a first comparator configured to compare the first reference voltage and the analog signal and to output the comparison result as a first comparison signal; and
a second processing unit to which a second reference voltage is supplied, the second processing unit including a capacitor and a second comparator configured to compare a voltage of the capacitor and the second reference voltage and to output the comparison result as a second comparison signal,
wherein the first processing unit:
generates a higher-order bit of the digital signal, in accordance with a result of measuring a time from when the comparison of the first processing unit is started to when a level of the first comparison signal is changed, and
outputs, to the second processing unit, a delay signal which the delay circuit generates by delaying the first comparison signal based on the clock signal, and
wherein the second processing unit:
starts charging of the capacitor in response to changing the level of the first comparison signal,
ends the charging of the capacitor in response to changing a level of the delay signal, and then
generates a lower-order bit of the digital signal, in accordance with a result of measuring a time from when the comparison of the second processing unit is started to when a level of the second comparison signal is changed.

2. The solid-state imaging apparatus according to claim 1, wherein
the analog signal includes a first analog signal containing a noise component and a second analog signal containing the noise component and a component corresponding to light incident on the pixel portion, and
the digital signal includes a first digital signal corresponding to the first analog signal and a second digital signal corresponding to the second analog signal.

3. The solid-state imaging apparatus according to claim 1, wherein a period from the changing the level of the first comparison signal to the changing the level of the delay signal includes at least one cycle of the clock signal.

4. A solid-state imaging apparatus comprising:
an imaging unit that includes a pixel portion in which a plurality of pixels are arranged; and
a conversion unit that converts an analog signal output from the imaging unit to a digital signal and outputs the digital signal,
wherein the conversion unit includes a first processing unit and a second processing unit, the first processing unit generates, in accordance with a result of measuring a time from when a comparison between the analog signal output from the imaging unit and a first reference voltage is started to when a magnitude relationship between the analog signal and the first reference voltage is inverted, a higher-order bit of a digital signal corresponding to the analog signal, and
the second processing unit to which a clock signal having a first edge and a second edge is supplied, starts charging a capacitor in response to the inversion of the magnitude relationship in the first processing unit, ends the charging of the capacitor in response to an elapse of a predetermined time since the first edge of the clock signal supplied immediately after the charging has started, and then generates a lower-order bit of the digital signal by counting the clock signal from when a comparison between the capacitor and a second reference voltage is started to when a magnitude relationship between the capacitor and the second reference voltage is inverted,
wherein the second processing unit includes a first path and a second path that are arranged in parallel to each other, and includes a constant current source that is arranged in series with the first and second paths, and
wherein the capacitor and a first switch for charging the capacitor are arranged in series in the first path, a second switch is arranged in the second path, and the second processing unit charges the capacitor by the constant current source by switching the first switch to a conductive state, switches the second switch to a non-conductive state while the capacitor is being charged and switches the second switch to a conductive state before and after the capacitor is charged.

5. The solid-state imaging apparatus according to claim 4, wherein the second processing unit includes a capacitor for generating a reference voltage, and uses a voltage generated by charging the capacitor for generating a reference voltage by the constant current source as the second reference voltage.

6. The solid-state imaging apparatus according to claim 2, calculating and outputting a difference between the first digital signal and the second digital signal that have been output from the conversion unit.

7. A camera comprising:
the solid-state imaging apparatus according to claim 1; and
a signal processing unit that processes a signal output from the solid-state imaging apparatus.

8. A method for driving a solid-state imaging apparatus that includes an imaging unit that includes a pixel portion in which a plurality of pixels are arranged and a conversion unit that converts an analog signal output from the imaging unit to a digital signal and outputs the digital signal, wherein the conversion unit includes: a first processing unit, to which a first reference voltage and a clock signal are supplied, including a delay circuit and a first comparator configured to compare the first reference voltage and the analog signal output from the imaging unit and to output the comparison result as a first comparison signal; and a second processing unit, to which a second reference voltage is supplied, including a capacitor and a second comparator configured to compare a voltage of the capacitor and the second reference voltage and to output the comparison result as an second comparison signal, the method comprising:
a first step of generating a higher-order bit of the digital signal, in accordance with a result of measuring a time from when the comparison of the first processing unit is started to when a level of the first comparison signal is changed, and outputting, to the second processing unit, a delay signal which the delay circuit generates by delaying the first comparison signal based on the clock signal, and a second step of starting charging of the capacitor in response to changing the level of the first comparison signal, ending the charging of the capacitor in response to changing a level of the delay signal, and then generating a lower-order bit of the digital signal, in accordance with a result of measuring a time from when the comparison of the second processing unit is started to when a level of the second comparison signal is changed.

9. The method for driving the solid-state imaging apparatus according to claim 8, wherein a higher-order bit and a lower-order bit of a first digital signal corresponding a first analog signal containing a noise component are generated respectively in the first step and the second step, the method further comprising:

a third step of generating a higher-order bit of a second digital signal corresponding to a second analog signal which is output from the imaging unit and which contains the noise component and a component corresponding to light incident on the pixel portion, in accordance with a result of measuring a time from when a comparison, performed by the first comparator, between the first reference voltage and the second analog signal level of a third comparison signal indicating a result of the comparison between the first reference voltage and the second analog signal is changed, and outputting, to the second processing unit, a second delay signal which the delay circuit generates by delaying the third comparison signal based on the clock signal; and a fourth step of starting charging the capacitor in response to changing the level of the third comparison signal, ending the charging of the capacitor in response to changing a level of the second delay signal, and then generating a lower-order bit of the second digital signal, in accordance with a result of measuring a time from when a comparison, performed by the second comparator, between a voltage of the capacitor and the second reference voltage is started to when a level of a fourth comparison signal indicating a result of the comparison between the voltage of the capacitor and the second reference voltage is changed.

10. The method for driving the solid-state imaging apparatus according to claim 9, further comprising a fifth step of calculating and outputting a difference between the first digital signal obtained in the first step and the second step and the second digital signal obtained in the third step and the fourth step.

11. The solid-state imaging apparatus according to claim 1, wherein the delay circuit generates the delay signal by synchronizing the first comparison signal to an edge of the clock signal.

\* \* \* \* \*